US012098648B2

(12) United States Patent
Delaporte et al.

(10) Patent No.: US 12,098,648 B2
(45) Date of Patent: Sep. 24, 2024

(54) TURBOMACHINE MODULE COMPRISING STUD PAIR LOCKING PLATES

(71) Applicant: SAFRAN AIRCRAFT ENGINES, Paris (FR)

(72) Inventors: Nicolas Daniel Delaporte, Moissy-Cramayel (FR); Antoine Giguet, Moissy-Cramayel (FR); Mostafa Benbouda, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 40 days.

(21) Appl. No.: 18/249,230

(22) PCT Filed: Oct. 13, 2021

(86) PCT No.: PCT/FR2021/051778
§ 371 (c)(1),
(2) Date: Apr. 14, 2023

(87) PCT Pub. No.: WO2022/084604
PCT Pub. Date: Apr. 28, 2022

(65) Prior Publication Data

US 2023/0392519 A1 Dec. 7, 2023

(30) Foreign Application Priority Data

Oct. 19, 2020 (FR) ...................................... 2010726

(51) Int. Cl.
*F01D 25/24* (2006.01)

(52) U.S. Cl.
CPC ........ *F01D 25/243* (2013.01); *F05D 2260/31* (2013.01)

(58) Field of Classification Search
CPC ........ F01D 25/24; F01D 25/243; F16B 39/24; F16B 39/108; F16B 2260/506; F05D 2260/30; F05D 2260/31
See application file for complete search history.

(56) References Cited

U.S. PATENT DOCUMENTS 5,259,725 A * 11/1993 Hemmelgarn ........ F01D 11/005 415/214.1
8,459,941 B2 * 6/2013 Jasko ...................... F01D 9/041 285/129.1

(Continued)

FOREIGN PATENT DOCUMENTS

| | | | |
|---|---|---|---|
| DE | 112015002713 | T5 | 3/2017 |
| FR | 3 090 052 | A1 | 6/2020 |
| WO | 2017/013349 | A1 | 1/2017 |

OTHER PUBLICATIONS

International Search Report mailed Feb. 23, 2022, issued in corresponding International Application No. PCT/FR2021/051778, filed Oct. 13, 2021, 5 pages.

(Continued)

*Primary Examiner* — J. Todd Newton
*Assistant Examiner* — Maxime M Adjagbe
(74) *Attorney, Agent, or Firm* — Christensen O'Connor Johnson Kindness PLLC

(57) ABSTRACT

An aircraft turbomachine module having two tubular casings equipped with first and second annular flanges assembled by studs received in the first flange and receiving nuts on the back of the second flange, each stud having an intermediate stretch of hexagonal shape cooperating with a locking plate. The locking plate can have a first orifice received on the intermediate stretch by at least two opposite walls, and a transverse body which is immobilized to prevent the rotation of the plate and that of the stud. Each plate can be fitted on two immediately adjacent studs and the body can have, for (Continued)

this purpose, a second orifice opposite the first orifice and which is received on an intermediate stretch of an immediately adjacent stud and cooperates with the intermediate stretch of hexagonal shape of the stud.

8 Claims, 3 Drawing Sheets

(56) References Cited

U.S. PATENT DOCUMENTS

| | | | | |
|---|---|---|---|---|
| 8,556,561 | B2 * | 10/2013 | Norton .................. | F04D 29/644<br>411/548 |
| 2003/0118399 | A1 * | 6/2003 | Schilling ............... | F01D 25/243<br>403/337 |

OTHER PUBLICATIONS

Written Opinion mailed Feb. 23, 2022, issued in corresponding International Application No. PCT/FR2021/051778, filed Oct. 13, 2021, 5 pages.

* cited by examiner

TURBOMACHINE MODULE COMPRISING STUD PAIR LOCKING PLATES

FIELD OF THE DISCLOSURE

Embodiments of the present disclosure relate to the field of the turbomachines and more particularly to the turbomachine modules that constitute it.

BACKGROUND

In a known way, a turbomachine is carried out, at the time of its final mounting, by an assembly of modules comprising compressor, combustion chamber and turbine modules which are assembled with each other. Each module comprises a stationary element, or stator, receiving an element movable in rotation, or rotor, carrying compressor or turbine vanes depending on whether the module is a compressor or turbine module. The stator is made up of an assembly of tubular casings, which comprise for their attachment, annular flanges that are assembled to each other by bolting.

Typically, the annular flanges of the tubular casings are assembled together by studs and nuts.

Thus, the assembling of a first annular flange of a first tubular casing with a second annular flange of a second tubular casing is carried out by means of a series of studs which are received in a stationary manner in the first annular flange, and more particularly in captive nuts which are attached to the back of this first annular flange in order to be secured to it. The assembling is also carried out by means of a series of corresponding nuts tightened on the back of the second annular flange. In particular, the first flange, which carries studs, receives the second flange, whose piercings are threaded onto the studs, and then the second annular flange is bolted to the first by means of the nuts which are received at the end of the studs.

This assembling is subject to high levels of vibration and thermal constraints during operation, which subject stresses on the bolted connections that can cause them to loosen.

To avoid such phenomena, it is common to propose means for immobilizing the rotation of the studs, in order to prevent them from escaping from the captive nuts in which they are received.

For this purpose, the ends of the studs usually comprise an intermediate hexagonal stretch to be immobilized in rotation. For each stud, this intermediate stretch is immobilized in rotation with respect to the second flange by means of a substantially transverse locking plate, which comprises a hexagonal-shaped orifice received on the hexagonal-shaped intermediate stretch, and a body extending transversely with respect to the axis C, which is immobilized to prevent the rotation of the plate and the stud. The body comprises two radial tabs, which extend to the periphery of the second annular flange onto which the two radial tabs are nested. As a result, the body, which is immobilized in relation to the second annular flange, prevents the rotation of the hexagonal-shaped intermediate stretch of the stud, and consequently the rotation of the stud.

In current turbomachines, a locking plate is used for each stud, which greatly reduces the overall weight of such an assembling. In addition, such a locking plate has to be carried out by machining, which increases the cost. Finally, the assembling of the first and second flanges requires high mounting times due to the installation of the locking plates, which increases the final cost of such an assembling.

It was not envisaged to replace the locking plates with a single locking disc or plate comprising all the hexagonal orifices, because on the one hand the studs are not generally distributed angularly in a uniform manner around the periphery of the flanges, which would impose a relative mounting of the flanges in a given angular position, and because on the other hand the cost of manufacturing such a disc or such a plate and the associated machining would make it prohibitively expensive to manufacture.

On the other hand, a ventilation sheet-metal is generally interposed axially between the annular flanges, and this metal-sheet is attached to the second annular flange by means of screws, the ends of which project from an external face of the second flange. The presence of these screws would require additional machining in such a locking plate or disc so that it could be supported on the second flange.

In another design known to the prior art, a locking plate was proposed in the document US-2003/0118399-A1 that traps two angularly consecutive studs. However, such a plate is not compatible with the aforementioned projecting screws.

There is therefore a real need for a locking plate that is economical to make, easy to mount, and can be adapted to different stud centre distances and the presence of projecting attachment screws.

SUMMARY

Embodiments of the disclosure remedies the disadvantage of the locking plates known in the prior art by proposing a simplified locking plate which is immobilized by means of a common support between at least two studs.

To this end, the disclosure proposes an aircraft turbomachine module comprising a first tubular casing with axis X, equipped with a first annular flange, and a second tubular casing with axis X, equipped with a second annular flange, assembled to the first annular flange by a plurality of studs of axis C parallel to the axis X, distributed around the axis X, each stud passing through the second flange, and comprising an end which projects from an external face of the second flange and which is able to receive a tightening nut, each stud further comprising an intermediate stretch with hexagonal shape, the turbomachine module comprising at least one locking plate applied to the second annular flange, which comprises a first orifice received on the intermediate stretch and at least two opposite walls of which cooperate with the intermediate stretch with hexagonal shape, the fitted plate comprising a body extending transversely to the axis C which is immobilized to prevent the rotation of the plate and that of the stud about its axis C, each plate being fitted on two immediately adjacent studs and in that the body comprises for this purpose, opposite the first orifice, a second orifice which is received on an intermediate stretch of an immediately adjacent stud and at least two opposite walls of which cooperate with the intermediate stretch of hexagonal shape of the immediately adjacent stud, characterised in that the turbomachine module comprises an annular sheet-metal attached between the first and second flanges, by screws of axes B which are distributed around the axis X parallel to the axis X, and which are each arranged angularly between two consecutive studs, the screws each comprising an end projecting from the external face of the second flange, which is received with clearance in a recess formed in the body extending transversely of each fitted plate, According to other characteristics of the turbomachine module:

- each stud is received in a stationary manner in the first flange,

- the opposite walls of the first and second orifices are parallel to a direction passing through the axes of the studs, and at least one stud can slide in at least first and second orifices in the direction,
- at least one of the first and second orifices is an open orifice shaped like a U which opens at one end of the body and which comprises two bottom walls, complementary to two panels of the intermediate stretch of hexagonal shape, which connect the two opposite walls,
- the first and second orifices are identical and open opposite each other at opposite ends of the body,
- one of the first and second orifices is hexagonal in shape, complementary to the intermediate hexagonal stretch of the stud,
- at least one of the first and second orifices is in the form of an oblong hole delimited by the two opposite walls and, at each of its ends, by a junction wall,
- one of the first and second orifices is hexagonal in shape and the other of the first and second orifices is shaped like an oblong hole, the orifices being arranged at opposite ends of the body,
- one of the first and second orifices is hexagonal in shape and the other of the first and second orifices is an open orifice shaped like a U, the orifices being arranged at opposite ends of the body.

DESCRIPTION OF THE DRAWINGS

Further characteristics and advantages of the disclosure will become apparent from the following detailed description, for the understanding of which reference is made to the attached drawings in which.

DETAILED DESCRIPTION

In the following description, identical reference numbers refer to identical or with similar functions parts.

Figure 1:
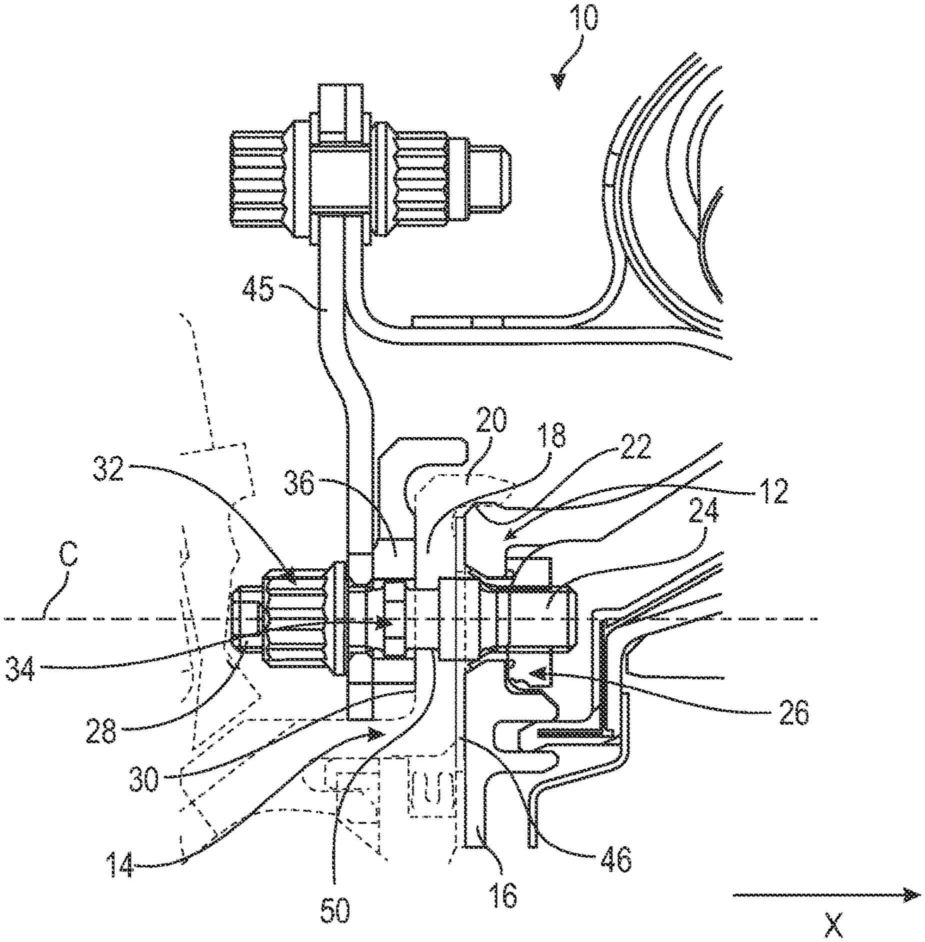
FIG. 1 is a cross-sectional view of the assembly of a first and a second tubular casing.

FIG. 1 shows a portion of an aircraft turbomachine module. In a known way, a turbomachine module comprises a rotor, generally carrying vanes (not shown), surrounded by a stator consisting of an assembling of tubular casings assembled together. For example, such an assembling comprises a series of tubular casings associated with different stages of a high-pressure turbine, a TCF (Turbine Centre Frame) inter-turbine casing, and a series of tubular casings associated with different stages of a low-pressure turbine. FIG. 1 illustrates, in a non-limiting manner of the disclosure, the detail of the assembling of a first tubular casing 12 of axis X, which is here a low-pressure turbine casing, with a tubular casing 14, also of axis X, which is a TCF inter-turbine casing. It will be understood that this provision is not restrictive of the disclosure and that the disclosure could concern the assembling of any two tubular casings.

The first tubular casing 12 is equipped with a first annular flange 16, and the second tubular casing 14 is equipped with a second annular flange 18, assembled to the first annular flange 16 by means of a plurality of studs with axes C parallel to the axis X, distributed around the axis X. The first annular flange 16 is, for example, centred in the second annular flange 18 by means of an annular collar 20 which extends from the second flange 18 and which receives the periphery of the first flange 16. In FIG. 1, a single stud 24 is shown.

Figure 3:
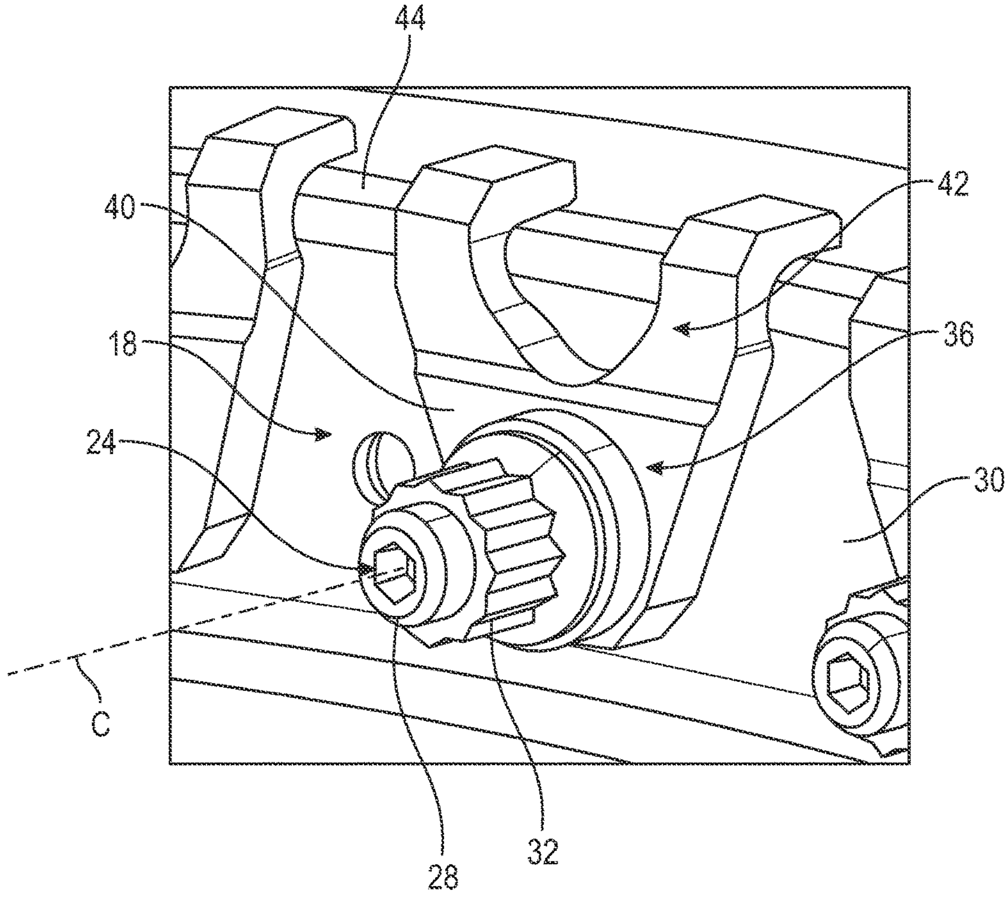
FIG. 3 is a perspective view of the assembling of the first and second annular flanges.

Each stud 24 is received in a stationary manner in the first flange 16. It could, for example, be received in a non-opening threading of the first flange 16, however, preferably the stud 24 is received in a captive nut 26. It passes through the first and second flanges, and comprises an end 28 projecting from a face 30 of the second flange 18. The stud 24 receives at its end 28 a tightening nut 32, shown in FIGS. 1 and 3.

The stud 24 also comprises a polygonal intermediate stretch 34, which is intended to allow the immobilisation of the stud 24 against rotation. In the figures, an intermediate stretch 34 of hexagonal shape is shown, but it will be understood that this configuration is not restrictive of the disclosure and that it could be, for example, a splined or square cross-section intermediate stretch.

In order to allow the immobilisation of the stud 24 against rotation by means of its intermediate stretch 34, the turbomachine module comprises at least one locking plate 36, which is applied to the second annular flange 18 and which is fitted to each stud 24.

Figure 2:
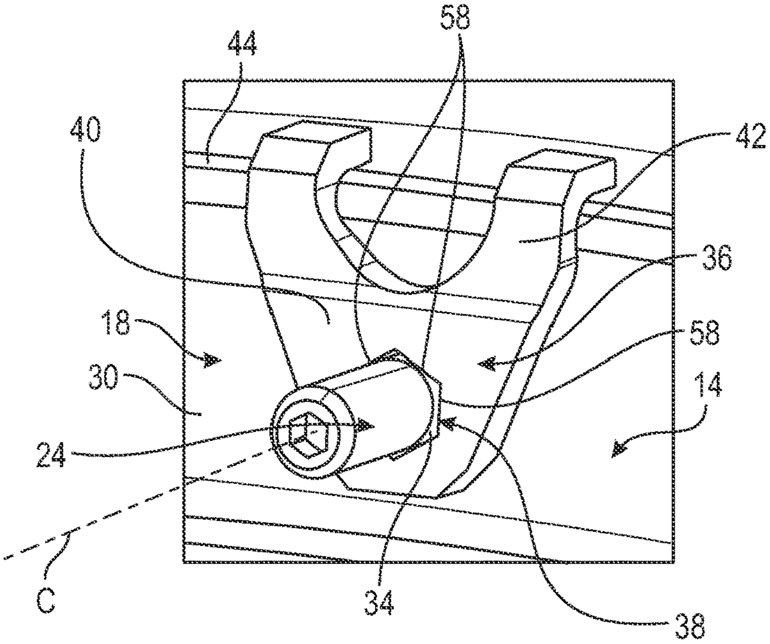
FIG. 2 is a perspective view of a locking plate according to the prior art supported on a second annular flange and received on a stud of a first annular flange.

As shown in FIG. 2, this locking plate 36 comprises a first orifice 38, which is received on the intermediate stretch 34 of the stud 24 and is passed through by it. This first orifice 38 comprises at least two opposite walls 58 which cooperate with the hexagonal intermediate stretch 34, Conventionally, the orifice 38 is shaped as a polygonal, in this case hexagonal, orifice 38 which is complementary to the polygonal intermediate stretch 34, and which is nested onto the intermediate stretch 34. Here the orifice 38 thus comprises three pairs of opposing walls 58 corresponding to the six panels of the hexagonal shape.

The locking plate 36 further comprises at least one body 40, extending transversely to the axis C, which is immobilized to prevent the rotation of the locking plate 36 and consequently of the stud 24.

According to the prior art, the body 40 comprises two curved tabs 42 which are intended to be supported on the periphery 44 of the second annular flange 18.

The turbomachine module may also comprise, as shown in FIG. 1, a support plate 45 which is interposed on the stud 24 between the locking plate 36 and the nut 32.

In this configuration, each stud 24 is therefore immobilized in rotation by means of a locking plate 36. It is therefore necessary to use as many locking plates 36 as there are studs 24. This configuration increases the cost of assembling the turbomachine module by requiring numerous assembly operations. In addition, such a locking plate 36 is usually machined so that its curved tabs 42 cooperate with the periphery 44 of the second annular flange 18 and is particularly expensive for this purpose.

The disclosure remedies this disadvantage by proposing a simplified locking plate using an alternative support.

Figure 5:
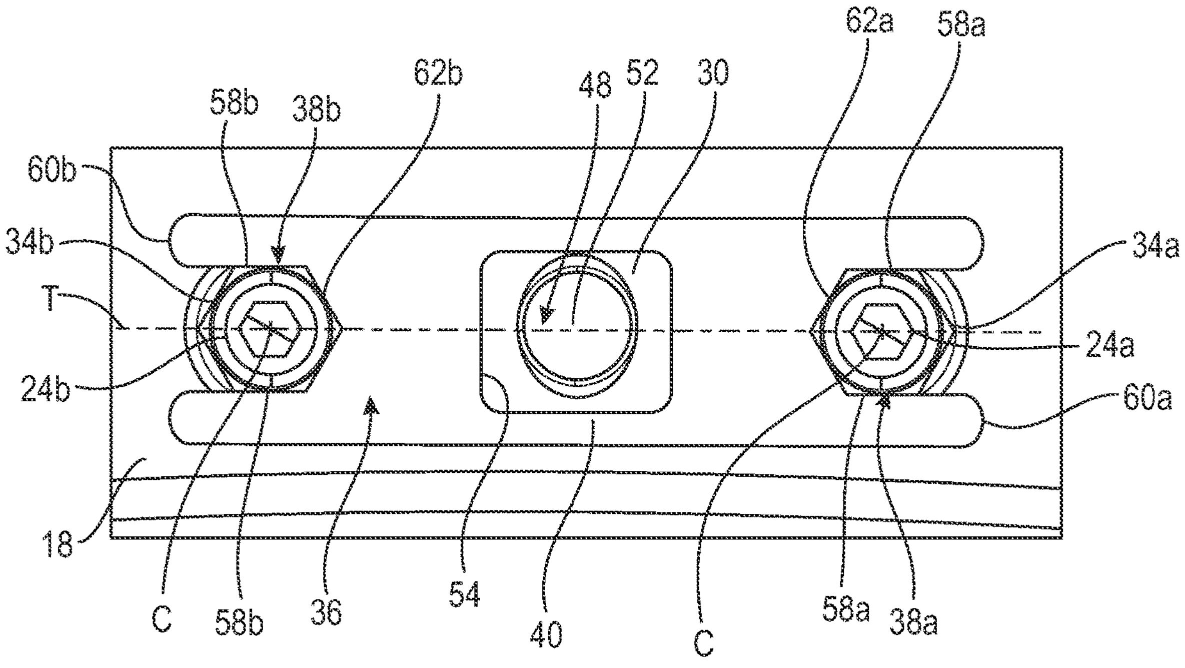
FIG. 5 is a front view of a first embodiment of the disclosure comprising a locking plate with two studs comprising two open orifices shaped like a U.
Figure 6:
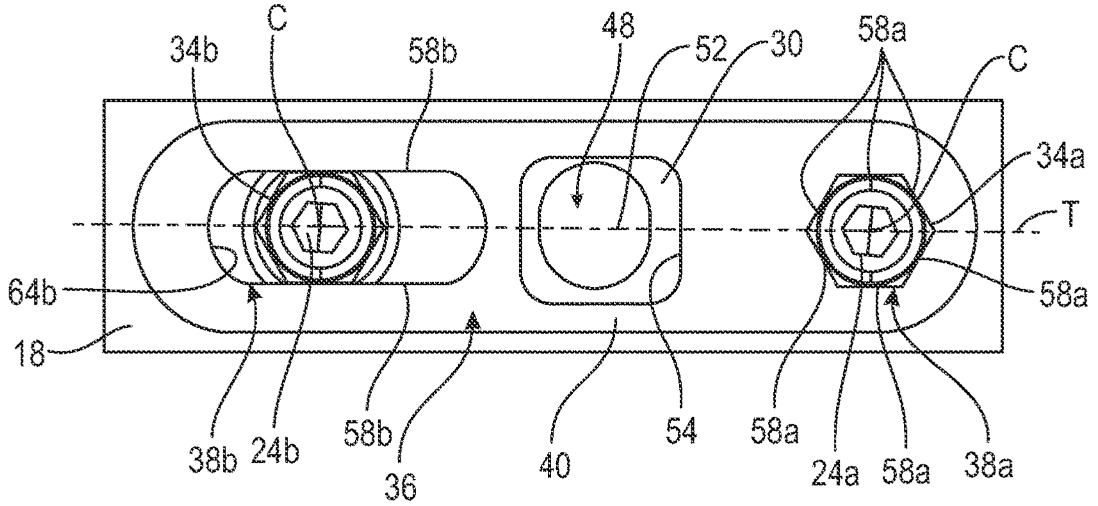
FIG. 6 is a front view of a second embodiment of the disclosure comprising a locking plate with two studs comprising a hexagonal orifice and an orifice comprising an oblong hole.

In accordance with the disclosure, as shown in FIGS. 5 and 6, in order to allow a stud 24*a* to be immobilized in rotation by means of its intermediate stretch 34*a*, the turbomachine module comprises, as before, a locking plate 36, which is applied to the second annular flange 18 and which is fitted to each stud 24*a*.

This locking plate 36 comprises a first orifice 38*a*, received on the intermediate stretch 34*a* and of which at least two opposite walls 58*a* cooperate with the intermediate stretch 34 of hexagonal shape, As before, the locking plate 36 comprises at least one body 40, extending transversely to the axis C, which is immobilized to prevent the rotation of the locking plate 36 and consequently of the stud 24*a*.

To propose further support, in accordance with the disclosure, each plate 36 is fitted to the stud 24*a* but also to an immediately adjacent stud 24*b*. To this end, the body 40 comprises, opposite the first orifice 38*a*, a second orifice 38*b* which is received on an intermediate stretch 34*b* of the immediately adjacent stud 24*b*. The second orifice 38*b* comprises at least two opposite walls 58*b* which cooperate with the intermediate hexagonal-shaped stretch 34*b* of the immediately adjacent stud 24*b*.

Figure 4:
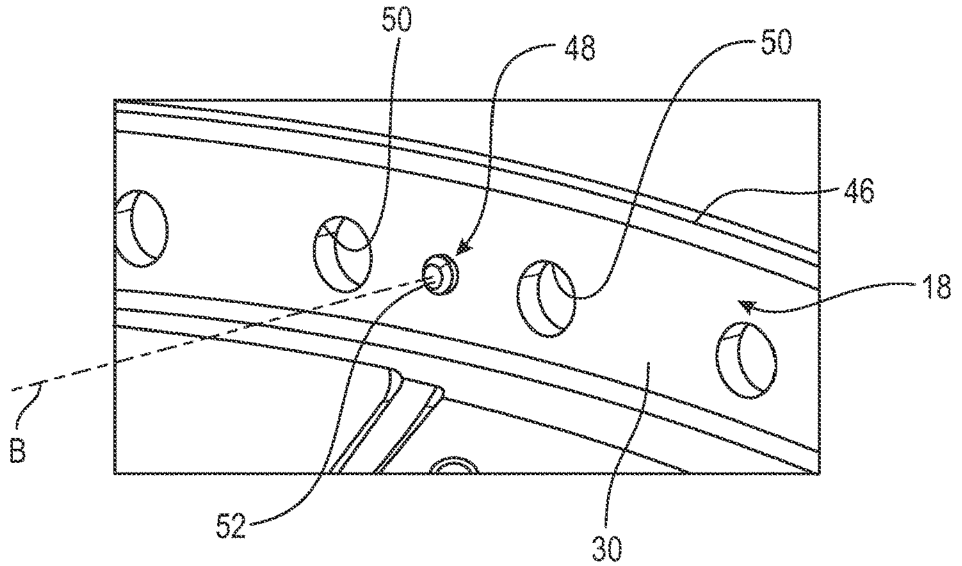
FIG. 4 is a perspective view of the second annular flange, bare, equipped with only the annular sheet-metal.

In a known manner, as illustrated in FIGS. 1 and 4, the turbomachine module may comprise an annular sheet-metal 46 which is mounted between the first and second flanges 16,18. This sheet-metal 46 acts as an insulation sheet-metal. The sheet-metal 46 is attached to at least the second flange 18 by screws 48 with axes B which are parallel to the axis X, and are distributed around the axis X. Each screw 48 is angularly arranged between two consecutive studs. FIG. 4 shows a screw 48 arranged between two piercings 50 in the second flange 18 intended to allow the passage of the studs 24.

Each screw 48 comprises an end 52 projecting from the external face of the second flange 18.

It is therefore advantageous that the mounting of the locking plates 36 of the turbomachine does not interfere with this protruding end 52.

In a conventional mounting, each locking plate 36 is independent, so the protruding ends 52 of the screws 48 do not interfere with these locking plates 36.

According to the disclosure, it is instead necessary for the transversely extending body 40 of each fitted plate 36 to comprise at least one recess 54 in which the projecting end 52 of the screw 48 is received with clearance. This configuration allows to ensure that the plate 36 is mounted around the end of the screw.

Advantageously, the plate 36 is adaptable to different stud centre distances 24*a*, 24*b*. This makes it possible to equip turbomachine modules of different sizes with plates 36 of the same size.

To allow for this adaptability, the opposing walls 58*a*, 58*b* of the first and second orifices 38*a*, 38*b* are parallel to a direction T passing through the axes C of the studs 24*a*, 24*b* and at least one of the studs 24*a*, 24*b* can slide in at least one of the first and second orifices 38*a*, 38*b* along the direction T.

For example, as shown in FIG. 5, at least one of the first and second orifices, in this case the two orifices 38*a*, 38*b*, are shaped like a U open orifices, each of which opens at a corresponding end 60*a*, 60*b* of the body 40. Thus the orifices 38*a*, 38*b* open at opposite ends 60*a* and 60*b*.

The orifices 38*a*, 38*b* each comprise two bottom walls 62*a*, 32*b*, complementary to two panels of the intermediate stretch 34*a*, 34*b* of hexagonal shape, which connect the two opposite walls 58*a*, 58*b*. The plate 36 can therefore immobilise at least two and up to four of the six panels of each hexagonal intermediate stretch 34*a*, 34*b*.

In a first embodiment which has been shown in FIG. 5, the first and second orifices 38*a*, 38*b* are identical and open away from each other at the opposite ends 60*a*, 60*b* of the body 40.

The plate 36 may therefore be disposed on any pair of studs 24*a*, 24*b* whose centre distance is at least equal to a minimum distance by which the intermediate stretches 34*a* are supported against the walls 62*a*, 62*b*, and for any greater centre distance as long as the studs 24*a*, 24*b* do not escape from the orifices 38*a*, 38*b*. For centre distances of studs 24*a*, 24*b* in which the intermediate stretches 34*a* are not supported against the walls 62*a*, 62*b*, the plate 36 thus has a sliding latitude in the direction T but is immobilized by the tightening of the nuts 32.

As illustrated in FIG. 6, at least one of the first or second orifices 38*a* or 38*b* may be hexagonal in shape, complementary to the hexagonal intermediate stretch 34*a* or 34*b* of the stud 24*a*, 24*b*, while the other orifice offers a latitude of movement in the T-direction in order to allow the adaptability to different centre distances. The other orifice may thus be an open orifice shaped like a U as described above with reference to FIG. 5.

However, to propose this latitude of movement, as illustrated in FIG. 6, at least one of the first and second orifices 38*a*, 38*b* may also be in the form of an oblong hole delimited by the two opposing walls and, at each of its ends, by a junction wall. FIG. 5 shows an orifice 38*b* in the form of an oblong hole delimited by the two opposing walls 58*b* and, at each of its ends, by a circular arc junction wall 64*b*.

Thus, in FIG. 6, a second embodiment of the disclosure is shown comprising a first orifice 38*a* of hexagonal shape and a second orifice 38*b* shaped like an oblong hole, the orifices 38*a*, 38*b* being arranged at opposite ends of the body 40.

It will be understood that the body 40 could also comprise two orifices 38*a*, 38*b* shaped like oblong holes, as long as these orifices comprise opposite walls 58*a*, 58*b* parallel to the direction T passing through the axes C of the studs 24*a*, 24*b*.

The disclosure thus allows to immobilise in rotation the connection studs 24*a*, 24*b* of tubular casings by reducing the number of locking plates.

The invention claimed is:

1. An aircraft turbomachine module, comprising:

a first tubular casing with a first axis and having a first annular flange; and a second tubular casing with the first axis and having a second annular flange assembled to the first annular flange by a plurality of studs with second axes distributed around and parallel to the first axis, each of the plurality of studs passing through the second flange and comprising an end which projects from an external face of the second flange and which is configured to receive a tightening nut, each of the plurality of studs further comprising an intermediate stretch of hexagonal shape;

at least one locking plate applied to the second annular flange, the at least one locking plate having a first orifice received on the intermediate stretch and at least two opposite walls which cooperate with the intermediate stretch of hexagonal shape, the at least one locking plate comprising a body extending transversely with respect to the second axis which is immobilized to prevent the rotation of the at least one locking plate and that of each of the plurality of studs about the second axis, at least one locking plate being fitted on two immediately adjacent studs and the body, comprising a second orifice opposite the first orifice the second orifice being received on the intermediate stretch of an immediately adjacent stud and the at least two opposite walls which cooperate with the intermediate stretch of hexagonal shape of the immediately adjacent stud; and an annular sheet-metal attached between the first and second flanges by screws having third axes which are distributed around and parallel to the first axis, and which are each arranged angularly between two consecutive studs, the screws each comprising an end projecting from the external face of the second flange, which is received with clearance in a recess formed in the body extending transversely of the at least one locking plate.

2. The turbomachine module of claim 1, wherein the at least one opposite walls of the first and second orifices are parallel to a direction passing through the second axes and wherein at least one stud of the plurality of studs can slide in at least one of the first and second orifices in the direction.

3. The turbomachine module of claim 2, wherein at least one of the first and second orifices is an open orifice having a U shape which opens out at one end of the body and which comprises two bottom walls, complementary to two panels of the intermediate stretch of hexagonal shape which connect the at least two opposite walls.

4. The turbomachine module of claim 3, wherein the first and second orifices are identical and open opposite each other at opposite ends of the body.

5. The turbomachine module of claim 2, wherein one of the first and second orifices has a hexagonal shape complementary to the intermediate hexagonal stretch of at least one stud of the plurality of studs.

6. The turbomachine module according of claim 2, wherein at least one of the first and second orifices has the shape of an oblong shape delimited by the at least two opposite walls and by a junction wall at each end of the oblong hole.

7. The turbomachine module of claim 2, wherein one of the first and second orifices has a hexagonal shape and the other of the first and second orifices has an oblong shape, the orifices being arranged at opposite ends of the body.

8. The turbomachine module of claim 2, wherein one of the first and second orifices has a hexagonal shape and the other of the first and second orifices is an open orifice having a U shape, the orifices being arranged at opposite ends of the body.

* * * * *